Patented June 8, 1937

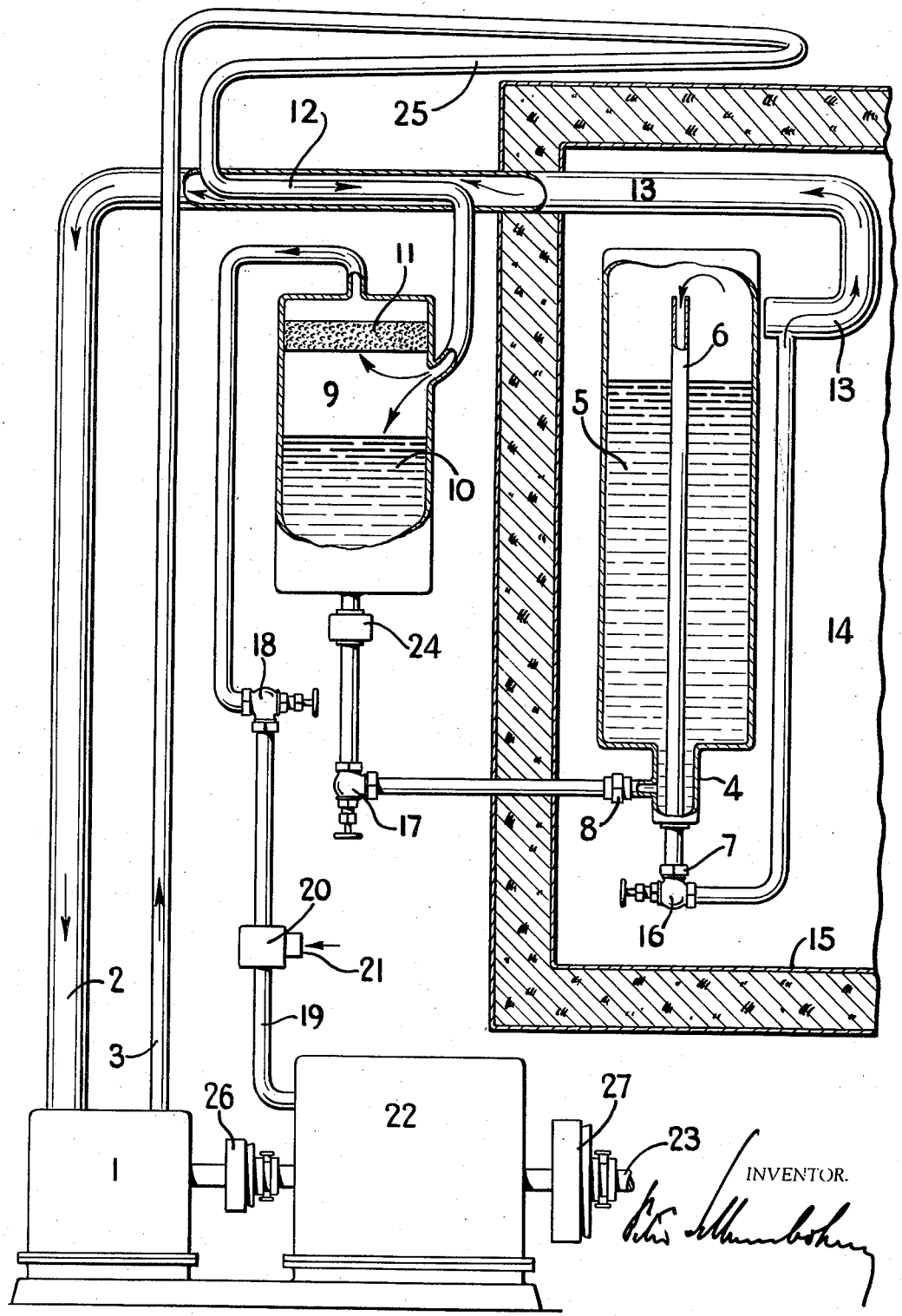

2,082,850

UNITED STATES PATENT OFFICE 2,082,850

REFRIGERATING SYSTEM

Peter Schlumbohm, New York, N. Y.

Application February 24, 1936, Serial No. 65,177

1 Claim. (Cl. 62—1)

The present invention relates to a refrigerating system in which a combustion engine is creating motive power for effecting the evaporation of a refrigerant and in which a chemical serves two functions in being the refrigerant in the refrigerating system and in being also used as fuel in the combustion engine. Such a system is described in my U. S. A. Patent No. 1,935,749. The system is especially appropriate for the use of organic chemicals, in first line hydrocarbons, like gasoline, butane and propane e. g., as in general use for combustion engines.

The present invention aims at improvements in the equipment as required for the cited system and is illustrated in the drawing diagrammatically, partly in view and partly in section.

The compressor 1 is driven by the combustion engine 22 and connected therewith by means of a clutch 26. A second clutch 27 is provided to connect the combustion engine with the shaft 23 of the driving mechanism of an automobile, ship, aircraft or other vehicle which is moved by the motive power of the combustion engine 22. Or the second clutch 27 may be used to connect the combustion machine with any other mechanical machine to be driven by the combustion machine, e. g. for the purpose of creating electric power. The suction tube 2 of the compressor 1 is connected with the evaporator 4, and the pressure tube 3 of the compressor 1 is connected with the condenser system 25, 12 and 9. The condensed refrigerant 10 is returning into the evaporator 4 through a connecting tube, and the flow is regulated by an automatically working valve of any known type 24 and by a shut off valve 17. The vapors of the refrigerant 5 in the evaporator are passing through a tube 6 and a tube 13 into the countercurrent heat exchanger 12, and from there into the suction tube 2 of the compressor 1.

The tank 9 of the condenser system serves as fuel tank for the combustion engine 22 and as claimed in the Patent 1,935,749 the engine has a carburettor 20 connected to the upper part of said tank to draw uncondensed fuel gas from said fuel tank. The fuel gas, e. g. butane, is passing from the tank 9 through a diffusion filter 11 and its flow into the carburettor 20 is regulated by the valve 18. Air is taken in by tube 21 and the mixture of the fuel gas and air is passing through tube 19 into the combustion engine 22. In case of an automobile or the like, the valve 18 may be directly combined with the accelerator mechanism to regulate the work of the engine. The evaporator 4 and the cooling coils 13 are arranged within the room 14 which is heat insulated by the walls 15.

Following the invention the diffusion filter 11 is provided to eliminate air from the condenser faster than the vapors; due to the fact that air has a smaller molecular weight than e. g. butane or propane it will diffuse faster through a porous wall or other known diffusion filters than those other substances.

Furthermore it is advantageous to use the transportation containers for compressed gases as evaporator in the refrigerating system described in order to simplify refilling. One or more of such steel bottles may be used as evaporator, and I prefer to use the type which is equipped with a tube extending from the neck of the steel bottle to the bottom of the container. In arranging such a steel bottle upside down as illustrated in the drawing, and by connecting their two couplings 7 and 8 with the tubing means as controlled by the shut off valves 16 and 17, the steel bottle—or the steel bottles if a whole battery of several ones is used and installed analogously—becomes a functional part of the refrigerating system as its evaporator. Aside of simplifying the refilling this step is saving installation costs as no costly special evaporator container is required.

If the system is used for refrigerating the loading space of a truck or the passenger room of an automobile, the compressor will be mounted together with the engine on the chassis whereas most of the other parts of the system will be mounted at the body of the car. In order to compensate the play of the springs I suggest to use flexible tubes as connecting means between the parts attached to the chassis and the parts attached to the body, especially for the tubes 2 and 3 and for the tube between the valve 18 and the carburettor 20.

The general principle of the refrigerating system as illustrated in the drawing and as described above being fully covered by claim 3 and claim 2 of my Patent No. 1,935,749.

I am restricting the claim of the present application to the details as set forth above and what I claim is:

A refrigerating system including a combustion engine to drive the compressor of the refrigerating system and a fuel tank adapted to receive condensed liquid refrigerant, uncondensed vapors of the refrigerant, decomposed refrigerant and air from the condenser of the refrigerating system, and connecting means between said fuel tank and said combustion engine, comprising a diffusion filter through which vapors and air pass on their way to said combustion engine.

PETER SCHLUMBOHM.